Figure 1:
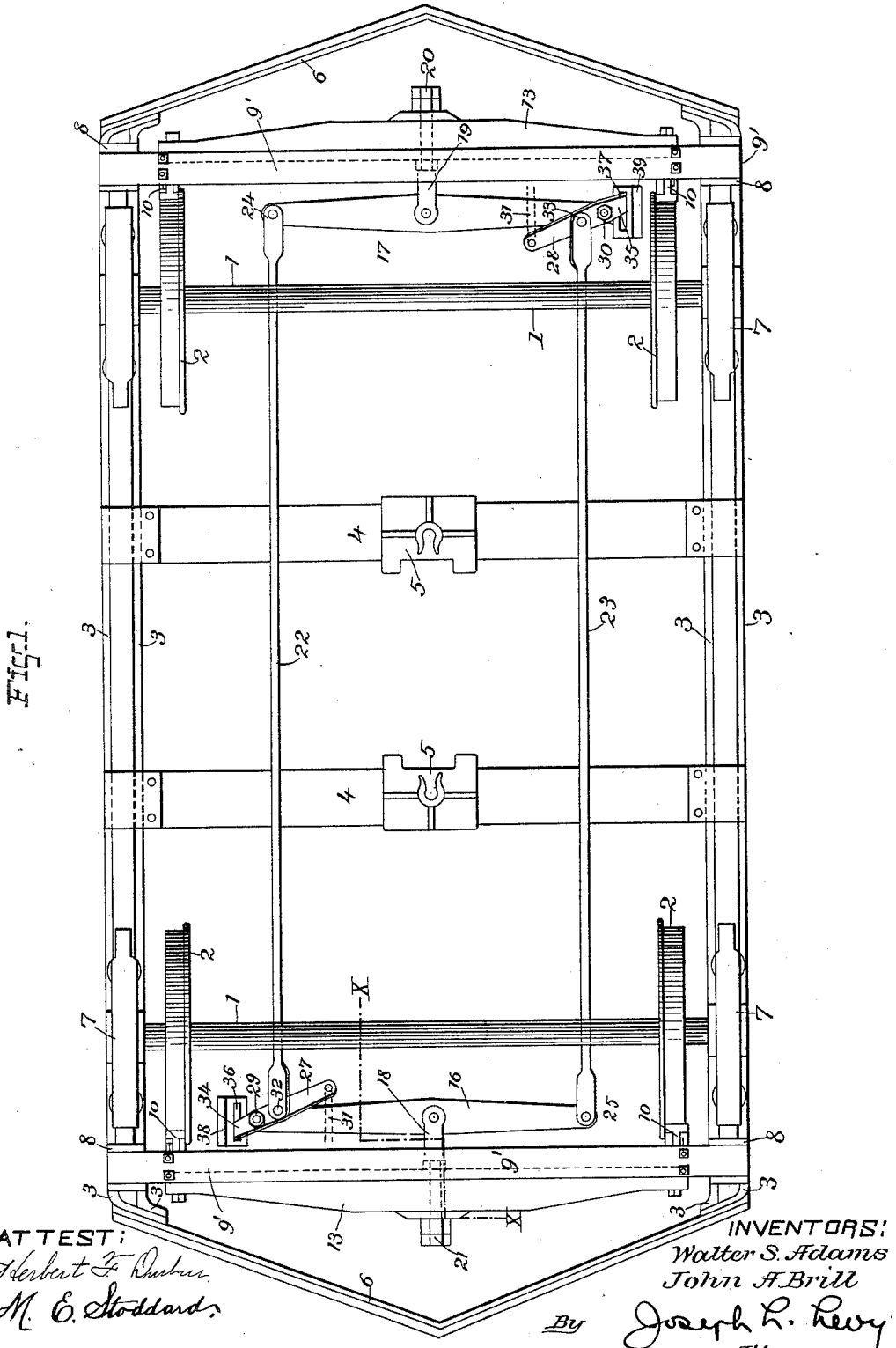

(No Model.) 3 Sheets—Sheet 2.

W. S. ADAMS & J. A. BRILL.
BRAKE MECHANISM FOR CARS.

No. 461,008. Patented Oct. 13, 1891.

ATTEST:
M. E. Stoddard
Herbert F. Dunlin

INVENTORS:
Walter S. Adams
John A. Brill
By Joseph L. Levy
Attorney

THE NORRIS PETERS CO., PHOTO-LITHO., WASHINGTON, D. C.

(No Model.) 3 Sheets—Sheet 3.

W. S. ADAMS & J. A. BRILL.
BRAKE MECHANISM FOR CARS.

No. 461,008. Patented Oct. 13, 1891.

ATTEST:
M. E. Stoddard
M. F. Daly

INVENTORS:
Walter S. Adams
John A. Brill
By Joseph L. Levy
Attorney

THE NORRIS PETERS CO., PHOTO-LITHO., WASHINGTON, D. C.

and

UNITED STATES PATENT OFFICE.

WALTER S. ADAMS AND JOHN A. BRILL, OF PHILADELPHIA, PENNSYLVANIA.

BRAKE MECHANISM FOR CARS.

SPECIFICATION forming part of Letters Patent No. 461,008, dated October 13, 1891.

Application filed May 26, 1891. Serial No. 394,209. (No model.)

*To all whom it may concern:*

Be it known that we, WALTER S. ADAMS and JOHN A. BRILL, both citizens of the United States, residing at Philadelphia, in the county of Philadelphia and State of Pennsylvania, have made certain new and useful Improvements in Brake Mechanisms, of which the following is a specification.

Our invention has special reference to brake mechanisms which have transversely-extending equalizing-levers connected to brake-beams, which equalizing-levers are connected at their ends to longitudinally-extending brake-rods and operated by upwardly-extending brake-levers, which levers are connected directly to the longitudinally-extending brake-rods.

This invention also has special reference to brake mechanisms the longitudinally-extending rods and transversely-extending levers of which are arranged in rectangular form, and which are so disposed upon the truck as to leave the center thereof free for the insertion of a motor or grip mechanism. The brake-levers by which the longitudinal brake-rods have ordinarily been operated to apply the brakes have been supported on the truck or by the longitudinal brake-rods themselves, which necessitated many connections, and by reason of the number of connections the action of the brake-levers is not rapid and certain.

Our invention consists in pivotally supporting the upright truck-brake lever (that is, the lever which operates the truck-brake system) upon one of the transversely-extending equalizing-levers, the equalizing-lever being provided at one end with an enlargement, whereby the brake-lever can be pivotally secured to it, and a further enlargement, either made integral with or bolted to the equalizing-lever, in which the lower end of the upright lever can move and by which it is guided and held steady. The pivotal union of the equalizing-lever and the brake-lever forms the fulcrum of the same, and at any suitable point above the said fulcrum we secure the longitudinal brake-rod. We prefer to secure but one brake-lever upon a single equalizing-lever and place the same at opposite ends or in the opposite angles of the rectangularly-disposed brake system—that is, as shown in the drawings, one upright brake-lever is secured at the lower right-hand corner to one of the equalizing-levers, and another one is secured at the upper left-hand corner of the opposite equalizing-lever.

The foregoing is the preferred form of structure; but it is obvious that the equalizing-levers may be provided with upright brake-levers on both ends. The upper end of the upright brake-lever is secured to a rod or chain leading from a windlass or lever mounted upon the car-body and by which it is operated; also, any other suitable means of connection and guidance of the upright truck-brake lever upon the equalizing-lever can be used without departing from our invention.

Another feature of our invention consists in inserting a spring between the brake-beam and equalizing-lever, by which they are normally preserved parallel to each other and which in a measure frees the shoe from the wheel after the brake-lever has been relieved.

We prefer that our brake mechanism should be supported upon the truck by what are known in the art as "side beams," which when united laterally from a frame which is independent of the effective motions of the car-body, and to connect said brake mechanism with a brake-beam carrying wheel-brake shoes, which brake beam and shoes depend from a support elevated above the said side beams.

By the term "equalizing-lever" we do not wish to be confined to a lever occupying the relative position to a brake system that the particular lever spoken of here does, but wish to be understood as including a lever included in the brake system other than the operating device on the car or its platform, to which the power of said operating device is primarily dispensed, so that the equivalent of the equalizing-lever need not be transversely disposed, nor need it be parallel to the axles, as shown.

Our invention further consists in the combination of parts hereinafter described.

Figure 2:
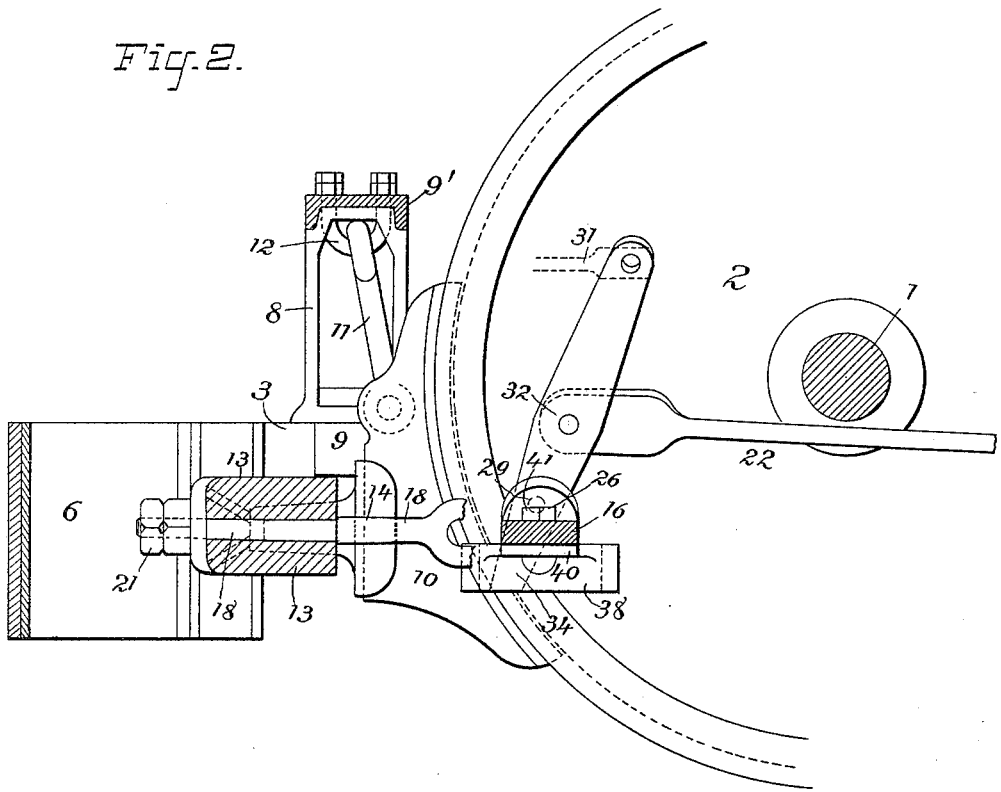
Figure 3:
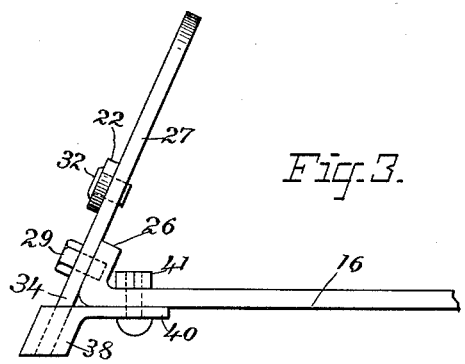
Figure 4:
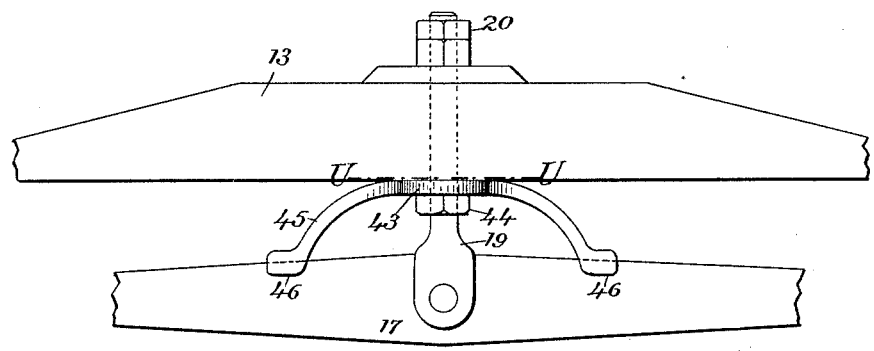
Figure 5:
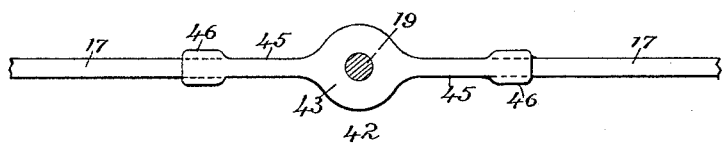

In the drawings, Figure 1 is a plan view of a truck structure wherein the brake beams and shoes are supported in the manner hereinbefore described, showing the method of applying my invention to such a structure. Fig. 2 is an enlarged detail view of a portion of the same, partly in section, the view being taken on the line x x, Fig. 1. Fig. 3 is a front elevation of a portion of one of the equalizing-levers, showing the method of connecting the upright truck-brake lever thereto. Fig. 4 is a plan, enlarged, of a brake-beam and equalizing-lever with interposed spring; Fig. 5, a side elevation on the line u u, Fig. 4.

In the drawings, 1 represents the axles, and 2 the wheels.

3 are side beams supported upon the axle-boxes in the usual manner and united laterally by the transverse beams 4, upon which seats 5 for a motor or grip are located. The fenders 6 are supported upon the side beams at both ends of the same.

7 are the upper spring-plates.

Extending upwardly from the said side beams at each end of the truck are brackets 8, having legs 9 for securing them to the side beams. The brackets 8 on each side of the truck are united laterally by a beam 9′, which extends across the truck-frame in front of the wheels and from which the brake-shoes 10 are supported by means of the links 11, which links in turn are supported by the U-bolt 12. The brake-shoes 10 are secured to the brake-beam 13 by the casting 14 in any suitable way.

At 16 17 are shown the equalizing-levers, which are pivotally secured to the brake-beams by means of the jaw-bolts 18 19 and nuts 20 21.

22 23 are the longitudinal brake-rods, which are connected directly to the equalizing-levers 16 17 at 24 25.

The foregoing briefly describes a structure for the support of the brake-beams and brake-shoes.

By the operation of one of the truck-brake levers all our brake-shoes are simultaneously applied.

Instead of securing the upright brake-levers to the longitudinal brake-rods, we secure them to the transversely-extending levers of the brake system and provide means thereon for pivotally supporting the brake-lever, and also means for guiding the lower end of said rod. In accordance with this we enlarge or upset the end of the equalizing-lever 16 to form thereon a shoulder 26, (best seen in Figs. 2 and 3,) and upon this shoulder we pivotally secure the upright truck-brake levers 27 28 by means of the bolts 29 30. It will be seen that the upright brake-levers are set at an angle on the equalizing-lever. By this peculiar disposition we obtain many advantages, among the most important of which are that the line of pull on the brake system is brought nearer to the line of draft of the truck, and therefore the windlass or car-brake lever can be located nearer the center of the car-platform and closer to the hand of the operator than it would be if the truck-brake lever were perpendicularly disposed. Also by dispensing with the connections of the horizontal brake-rods with truck-brake levers, as shown in the applications before referred to, and by placing said upright or truck-brake levers on the equalizing-levers, and by inclining the said truck-brake levers, we are enabled to locate the brake-rods 22 and 23 below the axles of the wheels. This is a great advantage. It compacts all the parts of the brake system and places the brake-rods where they will not interfere with the motor or other mechanism carried upon a truck or its frame.

The pivotal union of the truck-brake levers 27 28 to the equalizing-levers 16 17 at 29 and 30 forms the fulcra of the said brake-levers, and to the upper part of each of the said brake-levers is secured a link, rod, chain, or both a rod and chain 31, which leads to a windlass or operating-lever on the car-platform, and between these and the fulcra 29 and 30 are pivotally secured the ends of the brake-rods 22 23, as shown at 32 33.

It will be seen by reference to Figs. 2 and 3 that the shoulder 26 is given quite a large surface. This is done in order to give the truck-brake lever as much a bearing-surface as possible, to keep it steady and prevent it from wabbling. This may under certain circumstances be found to be insufficient, and in order to insure against any abnormal motion I secure a guide for the lower end of the brake-lever upon the equalizing-lever. It must be apparent that if the lower guide is not used, which I do not consider absolutely necessary, the brake-lever need only extend a sufficient distance to enable it to be pivotally secured to the equalizing-lever. In the present case it is formed of an extension 34 35, adapted to work in a slot 36 37, formed in a box or housing 38 39, having an arm 40 by which said box or housing is secured to the equalizing-lever 16 by means of the bolt 41. The slots 36 37 in the housings are inclined at the same angle as the brake-lever.

In the general structure shown in Figs. 1 and 2 we have designedly omitted to show any retracting device, such being done merely for the purpose of simplicity of illustration. It is very desirable, however, to have means for normally preserving the brake-beam and equalizing-lever parallel to each other, so that no unnecessary or lost motion shall be had between the parts when the brake is applied. The means we have adopted to secure this also acts to free the shoes from the wheel.

Reference is had to Figs. 4 and 5. A spring 42, having a central flat plate 43 and an aperture for the passage of the jaw-bolt 19, is secured in position between the equalizing-lever 17 and brake-beam 13 by passing the jaw-bolt through it, the nut 44 being used to hold the spring in this position. The arms 45, which end in the jaws 46, should be of sufficient elasticity to preserve the parallelism of the brake-beam to the equalizing-lever without bringing too much extra work on the brake-lever. When the brake-lever is operated, one of the arms 45 is bent toward the brake-beam, the jaw of the same working on the edge of the equalizing-lever, and upon the release of the brake-lever this particular arm returns the equalizing-lever to the position it previously occupied, the opposite one preventing any undue rebound. If the brake mechanism is set so that when in a normal condition the brake-shoes will be free from the wheels and the brake-beam and equalizing-lever lying parallel with each other, (as indicated in dotted lines, Fig. 4,) then the spring 42 will act to free the shoes from the wheel, after application, by the simple act of returning those parts to their normal position. We do not limit ourselves to this form of device, but have found it very useful.

It will thus be seen that besides the many advantages before enumerated we are enabled to support the truck-brake system entirely from the means used to support the brake beams or shoes and at these points only—that is to say, the entire brake system which is used to operate the brake-shoes is supported solely from said brake-shoes or brake-beam, depending upon which of the two are supported from the truck, and that the intervening mechanism is not secured in any manner whatsoever to any part of the truck or its appendages. This does away with many parts, simplifies the entire system, facilitates the removal of the brake system on the truck, for it would only be necessary to free the nuts 20 21 from the brake-beams to enable the horizontal brake-rods, transverse equalizing-levers, upright brake-levers, and their appendages to be removed entirely from the truck.

Inasmuch as the specific arrangement of the operative parts of the brake system is largely immaterial and that shown is selected mainly for convenience of illustration, many changes can be made from the same without departing from our invention.

Having thus described our invention, what we desire to claim by Letters Patent is—

1. A brake mechanism having normally-transverse equalizing-levers and upright brake-levers pivotally secured to said equalizing-levers, substantially as described.

2. In a brake system, the normally-transverse equalizing-levers, upright brake-levers pivotally secured to the equalizing-levers, and guides for the lower end of said brake-lever, secured upon the equalizing-levers, substantially as described.

3. In a brake system, the equalizing-levers 16, having a shoulder 26 and a slotted housing 38 on its end, and a brake-rod pivotally secured to said shoulder, the lower end of which is adapted to play in the housing, substantially as described.

4. A brake system having an equalizing-lever, shoulder 26, and slotted housing 38 on the end of said equalizing-lever, an upwardly-extending brake-lever secured thereto, a brake-rod secured to said upright brake-lever above its fulcrum, and guides for the lower end of said upright brake-lever, secured to the equalizing-lever below the fulcrum of the upright brake-lever, substantially as described.

5. A brake system having an equalizing-lever, shoulder 26, and slotted housing 38 on the end of said equalizing-lever, both the shoulder and housing being disposed at an angle to the said lever, an inwardly-extending brake-lever, shoulder, and housing, a brake-rod secured to said upright brake-lever above its fulcrum, and guides for the lower end of said upright brake-lever, secured to the equalizing-lever below the fulcrum of the upright brake-lever, substantially as described.

6. In a brake system, the brake-beam 13 and equalizing-lever 17, united by the jaw-bolt 19, and a spring engaging with the equalizing-lever, substantially as described.

7. In a brake system, the brake-beam 13 and equalizing-lever 17, pivotally united by the jaw-bolt 19, and a spring 42, held on the jaw-bolt and having arms 45 and jaws 46 in contact with the said equalizing-lever, substantially as described.

8. A brake system in which the transverse brake-beams and longitudinal brake-rods are normally disposed in rectangular form, comprising brake beams and shoes secured to the truck, transverse equalizing-levers secured to the brake-beams, upwardly-extending brake-levers pivotally secured to the said equalizing-levers, and longitudinal brake-rods secured at one end to the equalizing-levers and at the other to the said brake-levers, substantially as described.

9. In a brake mechanism, the combination, with the brake-beams 13, having brake-shoes, of transverse equalizing-levers 16 17, secured to the brake-beams, upwardly-extending brake-levers 27 28, fulcrumed to the said equalizing-levers, a guide for the lower portion of said brake-levers, secured to one end of the equalizing-levers, and longitudinal brake-rods 22 23, one end of each of which is secured to the brake-levers above their fulcra, the other end being secured to one end of the equalizing-lever, substantially as described.

10. The equalizing-lever 17, having the upright brake-lever 28 fulcrumed to the end thereof, substantially as described.

WALTER S. ADAMS.
JOHN A. BRILL.

Witnesses:
C. McQUILKIN,
HENRY C. ESLING.